United States Patent [19]
Koishi et al.

[11] 3,856,759
[45] Dec. 24, 1974

[54] VEHICLES FOR PRINTING INK

[75] Inventors: Hitoshi Koishi; Michio Takao; Yasuhiro Oda, all of Tokyo; Hideo Iguchi, Saitama-ken; Shigeru Kohase, Chiba-ken, all of Japan

[73] Assignee: Tokyo Printing Ink Mfg. Co., Ltd., Tokyo, Japan

[22] Filed: Oct. 13, 1972

[21] Appl. No.: 297,263

[30] Foreign Application Priority Data
Oct. 19, 1971 Japan.................................. 46-82115

[52] U.S. Cl. .............................. 260/78.4 D, 106/32
[51] Int. Cl. ............................................. C08f 27/08
[58] Field of Search .............................. 260/78.4 D

[56] References Cited
UNITED STATES PATENTS
2,733,267  1/1956  Koenecke ........................... 260/534
3,161,620  12/1964  Perkins et al. ..................... 260/78.4

Primary Examiner—Harry Wong, Jr.
Assistant Examiner—John Kight, III
Attorney, Agent, or Firm—Toren, McGeady and Stanger

[57] ABSTRACT

This invention provides vehicles for printing ink containing a resinous ingredient prepared by allowing a petroleum resin to undergo an addition reaction with an unsaturated polybasic acid or anhydride thereof and allowing the addition product to react with a polyalkylene polyamine that contains an alkyl group having from eight to 30 carbon atoms in the molecule to permit quick setting, produce good gloss and provide good stability on printing presses.

4 Claims, No Drawings

VEHICLES FOR PRINTING INK

This invention relates to vehicles for printing ink. More particularly, the invention relates to vehicles for printing ink containing a resinous ingredient prepared by allowing a petroleum resin to undergo an addition reaction with an unsaturated polybasic acid or anhydride thereof and then allowing the addition product to react with a polyalkylene polyamine that contains an alkyl group having from eight to 30 carbon atoms in the molecule.

In Japan, resin type quick-set inks are mostly used in offset printing. It is important for inks of this type to permit an increase of the printing time and enable many printed sheets to be piled without the aid of racks and the avoidance of set-off or blocking. For these purposes, it is necessary that the viscosity or tack of the ink on the printed matter be lost or the "set" conditions be attained as shortly as possible and that the print should be rich in gloss and color vividness. Especially because lithography is a printing process that takes advantage of the mutual repellency of ink and water, the ink to be used must have a high degree of repellency to dampening water and exhibit little variation in its flow properties due to emulsification of the dampening water.

Originally the vehicles generally used for the resin type quick-set inks for lithography were compositions consisting of a rosin-modified phenol-formaldehyde resin, a solvent, and/or an oil. A common disadvantage of such compositions was the high cost of the rosin-modified phenol-formaldehyde resin. Attempts have therefore been made to eliminate this disadvantage. For example, in Japan, a hydrocarbon resin prepared at low cost by the polymerization of unsaturated constituents of by-product oils from the petrochemical industry was used instead of the rosin-modified phenol-formaldehyde resin. However, inks using a vehicle based on the hydrocarbon resin (petroleum resin) alone as the resinous ingredient had very unsatisfactory physical properties, such as, inadequate setting, gloss, water repellency and pigment wetting. In view of the foregoing drawbacks, vehicles containing an esterification product of maleinized petroleum resin with or without the addition of a primary amine, primary alkanol amine, or ammonia were proposed (Japanese Patent Publication No. 6823/70). According to the invention of this Japanese Patent Publication, the pigment wetting property, gloss, and rub resistance of the ink were improved. On the other hand, increased proportions of polar and functional groups resulted in less water repellency, and greater variation of the flow property due to emulsification of the dampening water. Ink transfer and setting properties of the ink were also decreased. Further, water droplets present in the ink obstructed formation of continuous ink films with the consequence that the gloss of the ink was decreased, and drying delay and rub resistance were lessened. With these disadvantages, the new ink formulation failed to prove satisfactory.

We have now found useful vehicles for printing ink free of the aforementioned disadvantages. According to this invention, at least one selected from the group consisting of unsaturated polybasic acids or anhydrides thereof is added by reaction to a petroleum resin and the addition product is allowed to react with a composition that contains a polyamine, so that the product can be used as the resinous ingredient of a vehicle. Also, the resinous ingredient is employed which is prepared by the addition reaction of the petroleum reaction with at least one selected from the group consisting of unsaturated polybasic acids or anhydrides thereof and a subsequent reaction of the addition product with a polyalkylene polyamine that contains an alkyl group having from eight to 30 carbon atoms in the molecule, so that the chains of the molecule of the modified petroleum resin are linked by the amine derivative of a three dimensional polymer which acts as the cross linking agent. It is therefore an object of the present invention to provide vehicles for printing ink which improve the gloss of the ink through enhanced pigment wetting and increased molecular weight without sacrificing the water repellency.

Another object of the invention is to provide vehicles for printing ink which permit quick setting and produce good gloss with a remarkable improvement in the separation of the resin and solvent through a solvent release phenomenon due to a rise of the softening point of the resin and a drop of the solubility of the resin in the solvent.

Still another object of the invention is to provide vehicles for printing ink having good stability on printing presses.

Yet another object of the invention is to provide vehicles for printing ink which enable the ink to set quickly after printing.

A further object of the invention is to provide vehicles for printing ink which can give prints with excellent gloss and which are available at low cost.

For the purpose of the invention the petroleum resin is, for example, a resinous substance having thermoplastic reactivity. It may be prepared by polymerizing a cracked fraction containing an unsaturated hydrocarbon with a boiling point in the range from 30° to 280°C separated out of the petroleum distillates formed by pyrolysis, such as, steam or by catalytic cracking, in the presence of a catalyst of Friedel-Craft type or the like. Of the petroleum resins obtained in this way, those having a softening point between 80° and 180°C give better results. Such a petroleum resin, which is nonpolar, provide too poor pigment wetting for direct use as an ingredient of printing ink. In accordance with the present invention, therefore, at least one kind of an unsaturated polybasic acid or anhydride thereof is added by a reaction to the petroleum resin in order to add a polar group to the resin and thereby increase its molecular weight. Suitable unsaturated polybasic acids or anhydrides thereof for the practice of the invention include maleic acid, fumaric acid, citraconic acid, tetrahydrophthalic acid, and their anhydrides. They may be used either singly or in a combination of two or more. In order to carry out the reaction of the petroleum resin with such an unsaturated polybasic acid or acids or an anhydride or anhydrides thereof, the resin is dissolved in a petroleum solvent or aromatic hydrocarbon solvent and the solution is then heated together with the addition material. Alternatively, the petroleum resin may be singly heated to a molten state and then the addition material may be added dropwise in small amounts to effect an addition reaction in an atmosphere of an inert gas with or without the application of pressure ($1 \sim 10$ kg/cm$^2$) so as to avoid discoloration due to oxidation.

The reaction product thus obtained (the addition product of the petroleum resin with at least one of unsaturated polybasic acids or anhydrides thereof) was found unsatisfactory in respect of pigment wetting and drying properties, rub resistance, and stability. It has then been found that those properties can be improved by the further addition reaction of the resulting compound with a polyalkylene polyamine having an alkyl group that contains from eight to 30 carbon atoms in the molecule.

The polyalkylene polyamine (amine derivative) for use in the present invention is such that two or three amino groups are bonded to different carbons of more than two alkyl groups of methylene, ethylene, propylene, butylene or the like in the molecule, two of the amino groups being located at both terminals of the molecule. It is preferably a compound prepared by adding a stearyl group, palmityl group, oleyl group, lauryl group, beef tallow group, coconut oil or the like to the N of each amino group. The polyalkylene polyamine, when combined by reaction with one or more, preferably one, alkyl group that contains from eight to 30 carbon atoms, will give the best result. Suitable examples of such compounds are oleyl trimethylene diamine, trimethylene diamine monorosinate, and diethylene triamine monooleate.

The reason why the number of carbon atoms of the alkyl group to be added to the polyalkylene polyamine is limited to eight to 30 will now be explained. As already noted, a vehicle for printing ink is usually required to impart to the ink a good setting property and gloss on print as well as adequate press stability.. For improved setting, the resinous and solvent ingredients of the ink vehicle must quickly separate from each other on paper and instantaneously form a resin layer that contains pigments or the like and is free from aftertack. To attain this end, the molecular weight of the resin must be sufficiently large and within a the range that does not affect the printability of the ink. The same applies to the improvement of the gloss of ink on the printed matter. If the number of carbon atoms in the alkyl group is less than eight, the polyalkylene polyamine with a low boiling point will be partly vaporized by the heat of the addition reaction with the modified petroleum resin. Conversely if the alkyl group contains more than 30 carbon atoms, the compatibility of the modified petroleum resin with the oil and solvent added is increased to such an extent that slow setting and prolonged after-tack of the printed matter result.

The polyalxylene polyamine is employed in the practice of the invention for the following reason.. Amino groups present in a vehicle improve the pigment wetting property of the ink, but because of the tendency of the amino groups to combine easily with water, the water repellency of the ink will be adversely affected with the increase in the number of amino groups. If a satisfactory pigment wetting property is to be conferred on an ink by mere addition of amino groups to the petroleum resin that provides a poor pigment wetting property, a large amount of amine will have to be added. Such a vehicle will deteriorate the water-resisting quality of the ink and will never prove useful as such.

In accordance with the present invention, therefore, an alkyl group containing from eight to 30 carbon atoms is added to a polyalkylene polyamine having two or three amino groups in the molecule, and the resulting compound in turn is added to a resin prepared by modifying a petroleum resin with at least one unsaturated polybasic acid or anhydride thereof. In this way a cross-linking reaction is effected to attain an increase of the molecular weight and an improvement of separation of resin and solvent (discharge of solvent from the resin by a solvent release phenomenon) due to a decrease of the compatibility between the resin and solvent. Consequently, an ink is obtained which has improved setting property and remarkably improved gloss and rub resistance of ink owing to the polymerization and a rise of the softening point of the resinous ingredient. Regardless of the polymerization of the resin, the desirable flow property of the ink is kept unchanged. Therefore, the pigment wetting property of the ink is improved and the yield value of the component resin is reduced without giving any unfavorable effect upon the transfer property and water repellency of the ink. In this case the number of amino groups in the polyalkylene polyamine is two or three, preferably two. If the molecule contains more than three amino groups, the crosslink reaction of the amino groups will proceed to too great an extent thus adding to the complexity of the molecular structure, seriously affecting the compatibility between the resin and solvent, and deteriorating the flow property and gloss of the ink.

A polyalkylene polyamine having an alkyl group that contains from eight to 30 carbon atoms is added in an amount from 0.1 to 3 mols to the amount of at least one kind of unsaturated polybasic acid or anhydride thereof added to the petroleum resin (one mol). If the amount of the polyamine is less than 0.1 mol, the resulting vehicle will not have improved an pigment wetting property or increased molecular weight. If the amount is in excess of 3 mols, the vehicle will become poorly compatible, readily oxidizable, and tend to react with the pigment and undergo deterioration in quality. Low water repellency and high receptivity of the ink will stain the plate surface during printing. For these reasons the amount preferably ranges from 0.3 to 1.5 mols.

The reaction temperature is between 100° and 250°C and the reaction time is between one and 10 hours. If a suitable amount of a petroleum-hydrocarbon solvent having a boiling point of over 240°C is added to the reaction system, the uniformity of the reaction and the reaction time can be controlled.

The vehicles of the invention may be used in combination with compatible resins other than petroleum resins, e.g., alkyd resins, xylene resins, rosin resins, and phenol resins. Of those compatible resins, iso-tele or orthophthalic alkyd varnishes and urethanized alkyd varnishes having long oil lengths, for example, such that a drying oil or semidrying oil accounts for from 85 to 60 percent of the total amount are useful in further improving the pigment wetting property and water repellency and increasing the fluidity of printing ink without unfavorably affecting the characteristics of petroleum resin-modified varnishes, and can promote formation of a tough, dried film through oxidation polymerization.

Also, if a vehicle according to the invention is mixed with a drying or semidrying oil together with or instead of the compatible resin, the various properties of the resulting ink will be improved. Especially a urethanized oil effectively increases the setting time.

The present invention is illustrated by the following references and examples.

REFERENTIAL EXAMPLE 1

Vehicle consisting of rosin-modified phenol resin, oil, and solvent 450 g of a rosin-modified phenol resin having a softening point of 168°C and an acid value of 23 and 250 g of linseed oil are heated at 260°C for 30 minutes. With the addition of 300 g of a solvent (a petroleum or aliphatic hydrocarbon solvent having an average boiling point of 280°C), the whole mixture is thoroughly mixed.

REFERENTIAL EXAMPLE 2

Vehicle consisting of petroleum resin, oil, and solvent

A petroleum resin (450 g) having a softening point of 130°C is dissolved in linseed oil (250 g) at 200°C, and the solution is mixed up with the addition of 300 g of the same solvent as used in Referential Example 1.

REFERENTIAL EXAMPLE 3

Vehicle consisting of maleinized petroleum resin, oil, and solvent

A petroleum resin (450 g) having a softening point of 130°C and a bromine value of from 20 to 40 is melted by heating at 200°C, maleic anhydride is added, the mixture is kept at the same temperature for 2 hours, and then maleic acid is added. Thereafter, a mixture of linseed oil (250 g) and the same solvent (300 g) as used in Referential Example 1 is added to the solution with thorough mixing.

REFERENTIAL EXAMPLE 4

Vehicle consisting of resin esterified polyalkylene monoamine to maleinized petroleum resin, oil, and solvent After melting 450 g of a petroleum resin having a softening point of 130°C and a bromine value of from 20 to 40 by heating to 200°C, 20 g of maleic anhydride is added, and the mixture is held at that temperature for 2 hours for maleinization. Thereafter, 10 g of oleyl amine is added, and the mixture is allowed to react at 200°C for 2 hours. After the reaction, a mixture of 250 g of linseed oil and 300 g of the same solvent as used in Referential Example 1 is added to the reaction product and is mixed up.

EXAMPLE 1

Vehicle consisting of resin esterified polyalkylene diamine ($C_{18}$) to maleinized petroleum resin, oil, and solvent 450 g of a petroleum resin having a softening point of 130°C and a bromine value of from 20 to 40 is melted by heating at 200°C and is maleinized by the addition of 20 g of maleic anhydride and holding at the same temperature for 2 hours. Thereafter, 8 g of oleyl trimethylene diamine is added and the mixture is allowed to react at 200°C for 2 hours. After the reaction, a mixture of 250 g of linseed oil and 300 g of the same solvent as used in Referential Example 1 is added to the reaction product, and the whole mixture is thoroughly mixed.

EXAMPLE 2

Vehicle consisting of resin esterified polyalkylene diamine to maleinized petroleum resin, oil, and solvent 400 g of a petroleum resin having a softening point of 130°C and a bromine value of from 20 to 40 is melted by heating at 200°C. It is maleinized by adding 20 g of maleic anhydride and holding the mixture at the same temperature for 2 hours. Thereafter, 6.9 g of tridecyl trimethylene diamine is added and the mixture is allowed to react at 200°C for 2 hours. After the addition, a mixture of 250 g of linseed oil and 300 g of the same solvent as used in Referential Example 1 is added, and the whole mixture is mixed with thorough stirring.

EXAMPLE 3

Vehicle consisting of resin esterified polyalkylene triamine to maleinized petroleum resin, oil, and solvent To 400 g of a petroleum resin having a softening point of 130°C and a bromine value of from 20 to 40 and melted at 200°C is added 20 g of maleic anhydride. By holding the mixture at the same temperature for 2 hours maleic acid is added to the resin. Thereafter, 6.0 g of diethylene triamine monooleate is added and the mixture is allowed to react at 200°C for 2 hours. Following the reaction, a mixture of 250 g of linseed oil and 300 g of the same solvent as used in Referential Example 1 is added to the reaction product and the whole mixture is mixed up with stirring.

EXAMPLE 4

Vehicle consisting of resin esterified polyalkylene diamine to maleinized petroleum resin, isophthalic acid alkyd, and solvent Following melting at 200°C of 450 g of a petroleum resin having a softening point of 130°C and a bromine value of from 20 to 40, 20 g of maleic anhydride is added. The mixture is held at the same temperature for 2 hours to add maleic acid to the resin. Thereafter, 8 g of oleyl trimethylene diamine is added and the mixture is allowed to react at 200°C for 2 hours. After the reaction, a mixture of 250 g of isophthalic acid alkyd (oil length 70 percent) and 300 g of a solvent is added, and the whole mixture is thoroughly mixed.

EXAMPLE 5

Vehicle consisting of resin esterified polyalkylene diamine to maleinized petroleum resin, isophthalic acid alkyd, and solvent 480 g of a petroleum resin having a softening point of 130°C and a bromine value of from 20 to 40 is melted by heating at 200°C, 20 g of maleic anhydride is added, and the mixture is held at the same temperature for 2 hours to add maleic acid to the resin. Thereafter, 8 g of oleyl trimethylene diamine is added and the mixture is allowed to react at 200°C for 2 hours. After the reaction, a mixture of 150 g of isophthalic acid alkyd (oil length 70 percent) and 370 g of a solvent is added, and the whole mixture is thoroughly mixed.

Using the vehicles according to the references and examples given above, red inks of the following formulation are prepared. Each test ink is adjusted with the solvent to indicate an inkometer value of 10.

| | |
|---|---|
| Vehicle | 65–78 |
| Brilliant Carmine 6B | 20 |
| Solvent | 0–15 |
| Dryer | 2 |

The properties of the inks using the vehicles obtained in accordance with the references and examples are as tabled below.

Table

| Test sample | Setting time 1) (min) | Drying time 2) (hr) | No. of sheets piled without rack 3) | Gloss value (60° mirr.) 4) | Rub resistance 5) | Yld. value (dyn/cm²) 6) | Yld. value in emuls. condition (dyn/cm²) 7) | Ink transfer 8) |
|---|---|---|---|---|---|---|---|---|
| Ref. 1 | 35 | 8.0 | 1500 | 50 | 4 | 400 | 500 | 4 |
| 2 | 45 | 10.0 | 1500 | 40 | 1 | 1200 | 3300 | 1 |
| 3 | 40 | 10.0 | 1500 | 45 | 1 | 1120 | 3100 | 1 |
| 4 | 50 | 8.0 | 1000 | 48 | 3 | 450 | 500 | 3 |
| Ex. 1 | 25 | 7.5 | 2500 | 57 | 5 | 360 | 400 | 5 |
| 2 | 25 | 7.5 | 2500 | 57 | 5 | 360 | 400 | 5 |
| 3 | 25 | 7.5 | 2500 | 55 | 5 | 370 | 420 | 5 |
| 4 | 20 | 7.0 | 3000 | 58 | 5 | 380 | 420 | 5 |
| 5 | 10 | 6.0 | 4000 | 58 | 5 | 380 | 420 | 5 |

1) The time required for the ink printed at a rate of 0.1 g per 100 cm² on special art paper to dry touch-free.
2) Measured by an instrument of Choyokai type, made in Japan, under the conditions of 20°C 60% RH.
3) The maximum number of sheets of the above-mentioned special art paper printed without set-off on a machine having a printing capacity of 5,000 sheets an hour.
4) Measured in terms of 60° mirror gloss by a gloss meter, Model GM.3 made by Murakami Color research Institute of Japan.
5) Measured by a Sutherland Rub-tester under the conditions of 4 lb.-10 strokes. Value "5" is the maximum.
6) Measured by a spreadometer under the conditions of 20°C 60% RH.
7) Ten grams of ink thoroughly mixed with 5 cc of water in a mortar was used as the sample and tested by the above-mentioned spreadometer.
8) Uniformity of printed ink, color reproduction of half-tone, and flow properties in ink from the fountain roller were observed. Value "5" is the maximum.

Notes: 1. The time required for the ink printed at a rate of 0.1 g per 100 cm² on special art paper to dry touch-free.
2. Measured by an instrument of Choyokai type, made in Japan, under the conditions of 20°C 60% RH.
3. The maximum number of sheets of the above-mentioned special art paper printed without set-off on a machine having a printing capacity of 5,000 sheets an hour.
4. Measured in terms of 60° mirror gloss by a gloss meter, Model GM. 3 made by Murakami Color Research Institute of Japan.
5. Measured by a Sutherland Rub-tester under the conditions of 4 lb.-10 strokes. Value "5" is the maximum.
6. Measured by a spreadometer under the conditions of 20°C 60% RH.
7. Ten grams of ink thoroughly mixed with 5 cc of water in a mortar was used as the sample and tested by the above-mentioned spreadometer.
8. Uniformity of printed ink, color reproduction of half-tone, and flow properties in ink from the fountain roller were observed. Value "5" is the maximum.

As can be seen from the table, the vehicles prepared in the examples of the invention are superior to those of the referential examples in the setting time, number of sheets that can be piled without the aid of racks, gloss, rub resistance, yield value, and also yield value in emulsified conditions.

What is claimed is:

1. A vehicle for a printing ink which comprises a resinous ingredient prepared by allowing a petroleum resin having a softening point between 80° to 180°C to undergo an addition reaction with an unsaturated dibasic acid or anhydride thereof and then allowing the addition product to react with a polyalkylene polyamine in which two or three amino groups are bonded to different carbons of more than two alkyl groups of methylene, ethylene, propylene, or butylene, two of the amine groups being located at both terminals of the molecule, the amount of said polyalkylene polyamine being from 0.1 to 3 mols per mol of unsaturated dibasic acid.

2. Vehicles for printing ink according to claim 1 wherein said petroleum resin is a resinous substance of thermoplastic reactivity in which said resinous substance is prepared by polymerizing a cracked fraction containing an unsaturated hydrocarbon with a boiling point in the range from 30° ~ 280°C separated out of the petroleum distillates formed by pyrolysis or catalytic cracking in the presence of a catalyst of Friedel-Craft type.

3. Vehicles for printing ink according to claim 1 wherein said unsaturated polybasic acids or anhydrides thereof is maleic acid, fumaric acid, citraconic acid, tetrahydrophthalic acid or their anhydrides.

4. Vehicles for printing ink according to claim 1 wherein said polyamine is oleyl trimethylene diamine, trimethylene diamine monorosinate or diethylene triamine monooleate.

* * * * *